United States Patent [19]

Hays et al.

[11] 4,274,581

[45] Jun. 23, 1981

[54] PACKAGE HEAT EXCHANGER SYSTEM FOR HEATING AND COOLING

[75] Inventors: Herbert G. Hays, Homestead; Ralph W. Sweitzer, Williamsburg, both of Iowa

[73] Assignee: Raytheon Company, Lexington, Mass.

[21] Appl. No.: 967,180

[22] Filed: Dec. 6, 1978

Related U.S. Application Data

[60] Continuation of Ser. No. 422,397, Dec. 6, 1973, abandoned, which is a division of Ser. No. 185,631, Oct. 1, 1971, abandoned.

[51] Int. Cl.³ ............................................. F24H 3/06
[52] U.S. Cl. .......................................... 237/7; 165/40; 237/8 R; 237/17; 237/63; 237/81; 236/20 R

[58] Field of Search .................. 165/63, 59, 64, 60, 165/58, 48, 40; 122/367; 126/101; 237/16, 17, 81, 18, 7, 8 R, 81, 59, 63, 56; 236/20 R

[56] References Cited

U.S. PATENT DOCUMENTS

| 2,461,774 | 2/1949 | Robertson | 237/8 R X |
| 2,746,724 | 5/1956 | Leach | 219/365 X |
| 3,627,031 | 12/1971 | Ware | 165/48 X |
| 3,704,748 | 12/1972 | Hapgood | 122/367 PF X |

Primary Examiner—Albert W. Davis
Attorney, Agent, or Firm—M. D. Bartlett; J. D. Pannone; H. W. Arnold

[57] ABSTRACT

A compact heating and cooling system in which air ducts are connected to a host exchanger system through which a coolant fluid from a condensing unit or a heating fluid from a compact water heater is selectively directed by a control circuit so that the system may be mounted outside a building to be heated and/or cooled.

10 Claims, 6 Drawing Figures

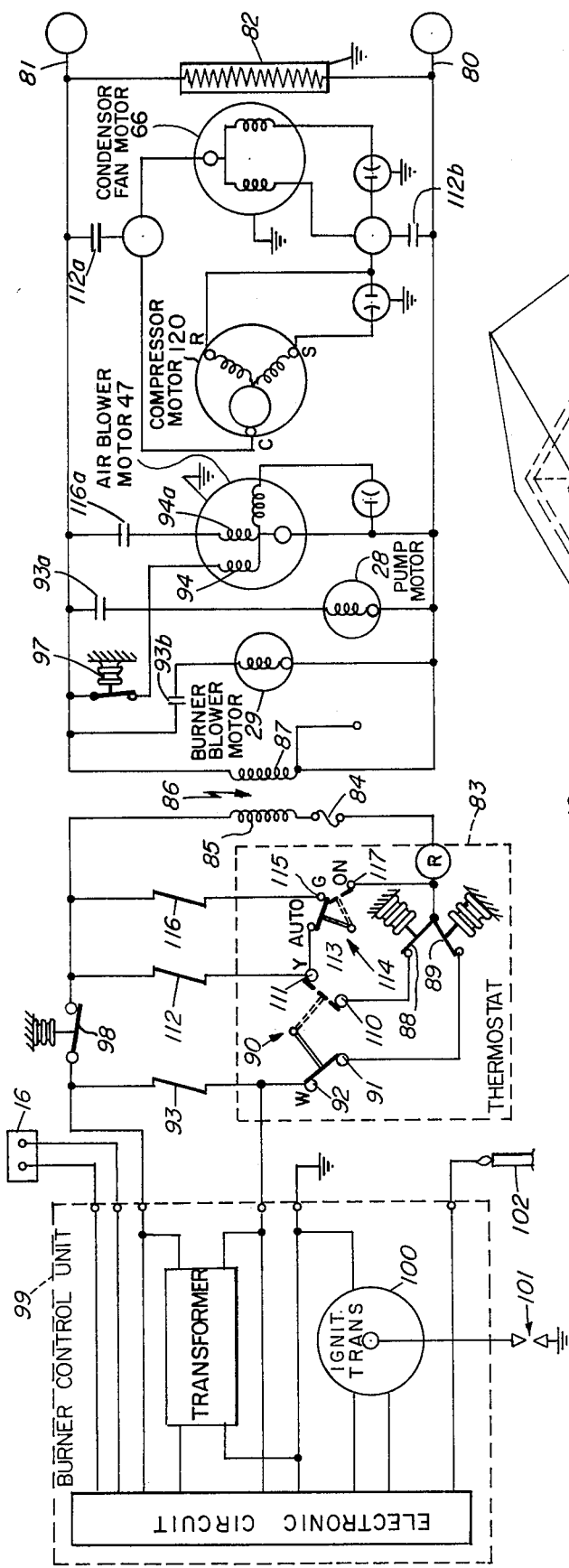
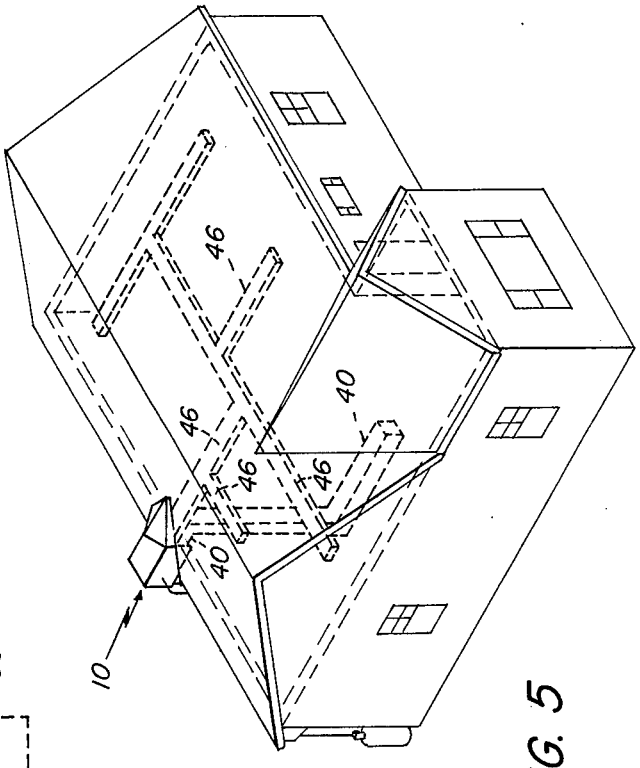
FIG. 5
FIG. 6

PACKAGE HEAT EXCHANGER SYSTEM FOR HEATING AND COOLING

CROSS-REFERENCE TO RELATED CASES

This is a continuation of application Ser. No. 422,397, filed Dec. 6, 1973 now abandoned, which is a division of application Ser. No. 185,631, filed Oct. 1, 1971 (now abandoned).

RELATED CASES

Application Ser. No. 10,334 (now U.S. Pat. No. 3,704,748) entitled Heat Transfer System filed Feb. 11, 1970, by William H. Hapgood and assigned to the parent company of the assignee of this invention is hereby incorporated herein and made a part of this disclosure.

BACKGROUND OF THE INVENTION

Combined heating and cooling systems are known in which a warm air furnace has associated therewith an air conditioning system having a cooling coil is placed in the air duct. However, such systems are essentially two complete systems, one a hot air heater which is relatively large and bulky and the other a complete air conditioner which is also relatively large and bulky.

It is also known that a common heat exchange liquid may be pumped throughout a large building to radiators having blowers associated therewith which will either blow hot or cold air depending on whether the liquid being circulated through the radiators has been heated or cooled by remotely located boilers or air conditioners.

Package heating and cooling units are also known where electric heating coils are placed in the cooling air ducts to heat the air when desired. However, such electric heat is neither economical nor sufficient for the total heating load in many areas of the country.

SUMMARY OF THE INVENTION

This invention discloses a compact combination heating and copling system in which a heater comprises a compact matrix heat exchanger for heating a fluid with the products of combustion. The fluid, which is preferably a liquid such as water, is circulated through a first heat exchanger is an air duct positioned in close proximity to the heater and hence the energy required to circulate the fluid from the heater through the air duct heat exchanger is minimized. An air cooled condensing unit is positioned adjacent the heater with a separate expansion type cooling heat exchanger in the same air duct path as the heating radiator. A single blower drives air through both heat exchangers in the air duct so that when the air conditioner is energized cold air is circulated through the duct work and when the heater is energized hot air is circulated through the duct work. The entire system assembly is packaged with the heat rejection heat exchanger of the condensing unit positioned at one end of the package and the heat exchangers in the air duct positioned at the other end of the package so that the package may be conveniently placed outside a home with the air ducts extending through a roof or wall of the home and connecting with ducts for distribution of the heated or cooled air throughout the home. By the use of a matrix type heater, several times more heat may be added to the air in the ducts during heating than is extracted during cooling and hence the package can be used for the total heating or cooling required in a home in any climate in the country.

This invention further discloses that a liquid may be used for circulating fluid through the heater's matrix heat exchanger and the heat exchanger in the air duct, and that such liquid may be operated at substantially atmospheric pressure thereby permitting a reduction in weight and cost of the heat exchangers compared with heat exchangers which would be required if they operated above atmospheric pressure. This is accomplished by circulating the liquid and blowing the air through the air ducts whenever the temperature of the fluid in the matrix heat exchanger is above a minimum temperature so that when the heater shuts down circulation of the liquid will continue thereby preventing boiling in the matrix heat exchanger which would result in loss of liquid from the system. Rapid recycling of the system is also possible with such a circulatory control system without which a substantial period of time for recycling is required since the formation of steam which would occur in the matrix heat exchanger would not cool the boiler sufficiently once is had been shut down unitl the boiler itself had cooled, for example, by radiation within the package configuration.

By packaging the entire assembly with the condenser for the air conditioner at one end and the heat exchangers for exchanging heat with the air to be circulated through the home at the other end, the components such as the condenser, compressor and the compact boiler or hot water heater positioned between the two ends a compact and inexpensive structure is achieved which may be assembled in the factory as a unit with the associated wiring and control circuitry and the duct work easily attached to the wall of the home. The package may be, for example, mounted on the roof or mounted directly against the wall of the home.

By the use of a combustion type heater in a package system which may be positioned outside the building, the heater fuel such as gas or oil may be stored outside the building and fed to the heater thereby eliminating a potential source of fire or odor.

This invention further discloses a double protection feature in the control circuit. More specifically, an upper limit safety switch, which is mounted on the heating unit, controls both the burner-blower and the gas burner control circuit. A gas pressure regulator feeds gas to the input of the burner-blower at a pressure slightly below atmospheric pressure such that if the gas control valve controlled by the burner control fails to close when the burner circuit is shut down, for example, by sticking of the solenoid valve, the blower supplying the burner will also shut down thereby eliminating the suction vacuum at the output of the gas regulator and hence stopping the flow of gas through the regulator.

BRIEF DESCRIPTION OF THE DRAWING

FIG. 5 illustrates an installation of the system of FIGS. 1 through 4 in a home; and FIG. 6 illustrates a schematic diagram of a control circuit for use with the system illustrated in FIGS. 1 through 4.

DESCRIPTION OF THE PREFERRED EMBODIMENT

Referring now to FIGS. 1 through 4, there is shown a package unit 10 having a base on which are supported side walls and a top which may be made of sheet metal removably attached to an angle iron frame as in conventional package heating units.

Positioned adjacent one side of the package 10 approximately midway between the ends thereof is a compact heater unit 11 preferably of the type disclosed in greater detail in the aforementioned application.

Figure 1:
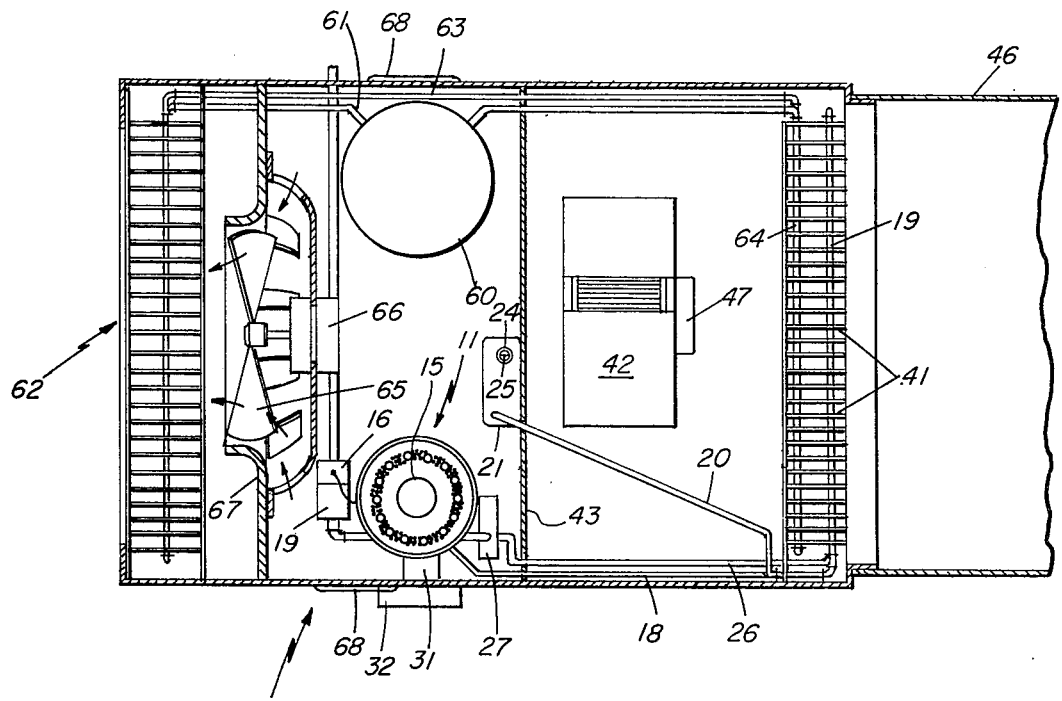
FIG. 1 illustrates a top plan view of a heating and cooling system embodying this invention.
Figure 2:
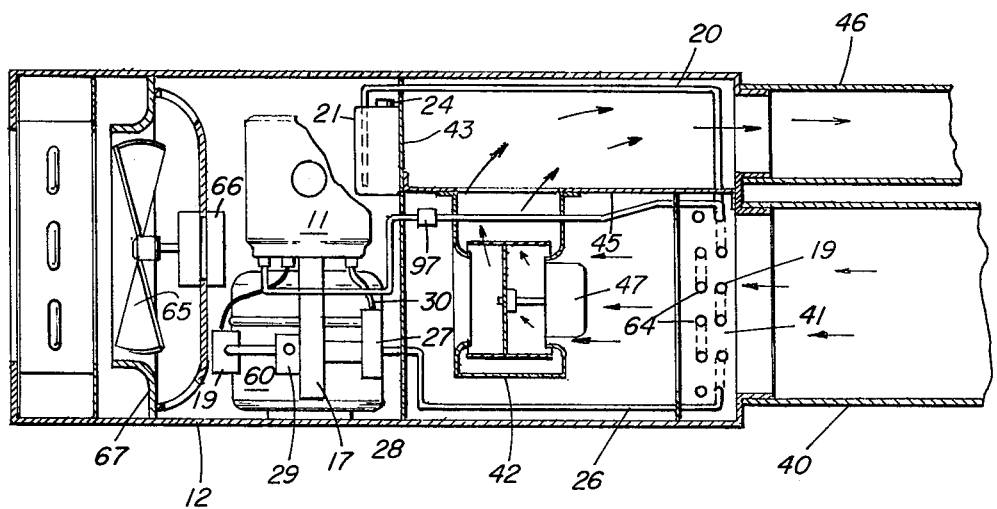
FIG. 2 illustrates a side elevation view of the invention illustrated in FIG. 1.
Figure 3:
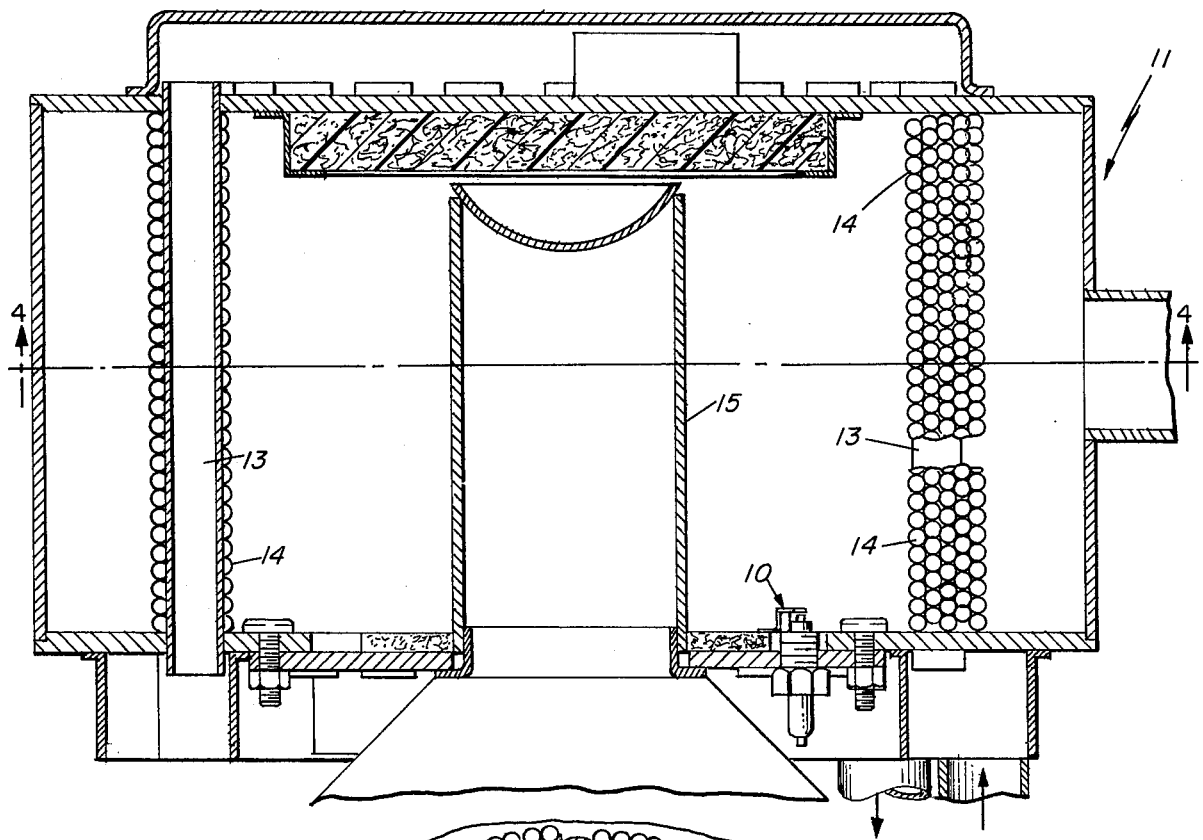
FIG. 3 illustrates a longitudinal sectional view of the heater illustrated in FIGS. 1 and 2 taken along line 3—3 of FIG. 4.
Figure 4:
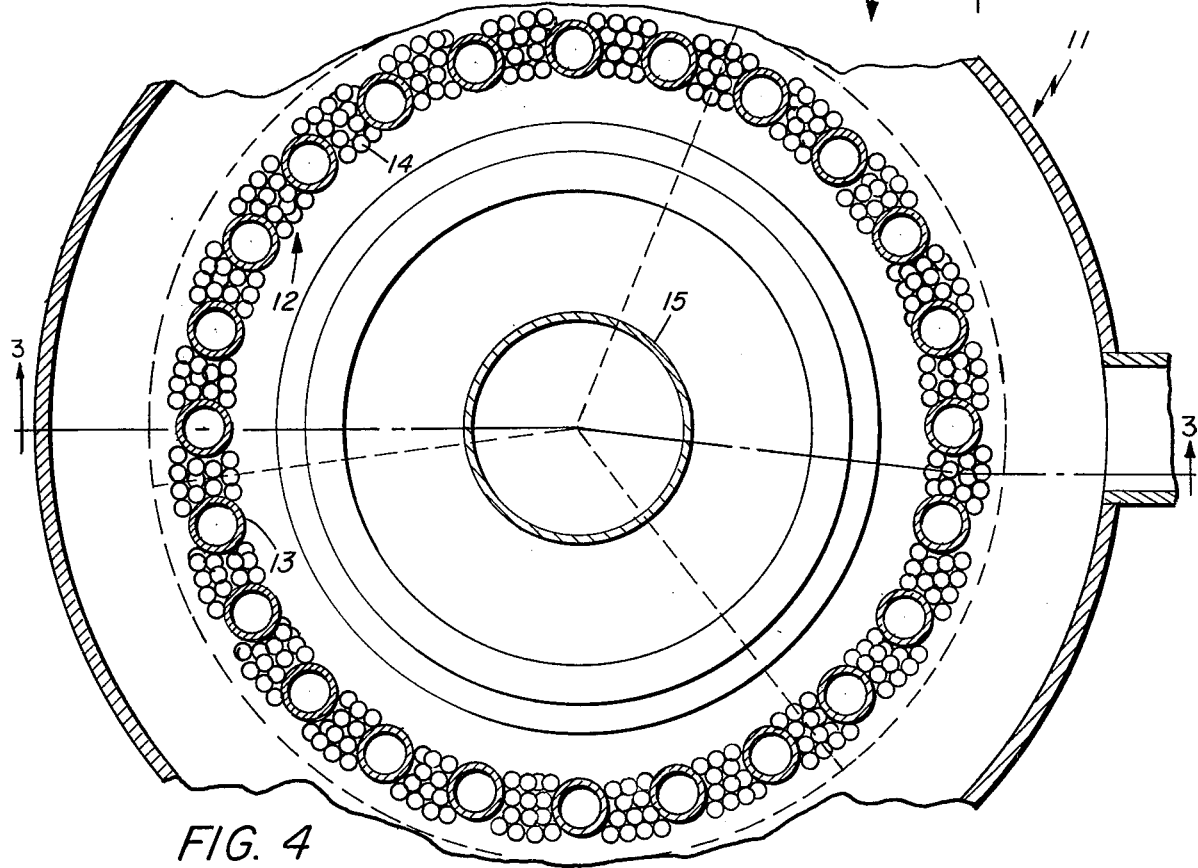
FIG. 4 illustrates a transverse sectional view of the heater illustrated in FIG. 3 taken along line 4—4 of FIG. 3.

As illustrated in greater detail in FIGS. 3 and 4, heater 11 consists of a cylindrical matrix 12 comprising a plurality of tubes 13 through which is circulated a liquid to be heated and the spaces between the tubes are filled with a plurality of spheres 14 bonded together and to the tubes to form the unitary thermally stable matrix 12. Flue gas produced by the products of combustion from a burner 15 centrally located within the matrix is forced outwardly through the spaces between the spheres along heat exchange paths having an average length through the matrix preferably less than 20 times the average radius of curvature of the spheres 14. Under these conditions large quantities of heat may be transferred from the burner 15 to the matrix. The liquid flowing through the tubes 13 extracts heat from the matrix to maintain all regions of the matrix below temperatures which would damage the matrix, for example, by melting the bonds between the spheres. More specifically, if the bonds between the spheres are formed by brazing copper plated steel balls, all regions of the matrix should be maintained below 1000° F.

Fuel is supplied to the heater 11 through a solenoid controlled valve 16 and a pressure regulator 19 whose output is gas at a pressure slightly below atmospheric pressure. The output of regulator 15 is fed to the input of a blower 17 driven by a blower motor 28 so that blower 17 supplies a fuel-air mixture to the burner 15 of the heater 11.

Liquid heated by the heater 11 is circulated through a pipe 18 to a heat exchanger 19 at one end of the package 10 and thence through a return pipe 26 to a return pump 27 which forces the fluid back through the tubes in the heater 11. As illustrated herein, the fluid makes six passes through the heat exchanger matrix 12 by reason of the upper and lower ends of tubes 13 communicating with upper and lower plenums having baffles which feed the input from pump 27 to the lower ends of a first group of four of the tubes 13, and the upper ends of said first group to the upper ends of a second group of said tubes 13 whose lower ends feed a third group and so on through six groups of tubes 13, with the last group feeding the heat exchanger 19 through pipe 18.

The upper end of heat exchanger coil 19 is also connected via pipe 20 to an expansion tank 21 having a vent pipe which is closed by a rubber grommet 24 having a slit 25 therein, hereinafter referred to as a split web grommet, to maintain the system substantially at atmospheric pressure while preventing any substantial vaporization of the liquid. The liquid may be, for example, pure water, or in the event the unit is to be mounted outside the area to be heated, a mixture of water and antifreeze such as ethylene-glycol.

Tank 21 is positioned in a region of the package without substantial heat insulation so that any vapors of the liquid which are generated in the system will condense in the tank 21.

A blower 42 driven by a blower motor 47 is positioned in the lower portion of a space between the heater 11 and the heat exchanger 19 which is separated from the region containing the heater 11 by a transverse wall 43. Blower 42 exhausts air through a horizontal wall 45 and thus draws air through fins 41 connected to heat exchanger coil 19 from a cold air return duct 40 which is connected to the system 10 adjacent heat exchanger 19. A duct 46 is connected to the outlet at the end of the package 10 above the duct 40 and conducts air which has been drawn over heat exchanger 19 back into the home to heat the home. The walls of the compartment containing the blower 42 may be insulated with insulating material (not shown) to prevent heat transfer of the air to the outside region of the system 10 and to absorb noise from the blower 42. As illustrated herein wall 43 separates the region containing the expansion tank 21 from the region into which blower 42 exhausts so that tank 21 may be maintained cooler than the output region from the blower 42 hence aiding in condensing any vapors produced in the heater system and entering the tank 21 through the pipe 20.

To provide for cooling the air blown into duct 46 by blower 42, for air conditioning, a cooling compressor 60 is provided on the opposite side of the cabinet from the heater 11. The compressor is of a conventional air conditioning type which compresses a refrigerant working fluid such as freon and supplies it through a pipe 61 to a condenser 62 of conventional type consisting of tubes and fins. Condenser 62 is positioned on the opposite end of the system 10 from the heating coil 19 and thus is exposed to the open air. A pipe 63 supplies cooled freon from condenser coil 62 to a freon expansion coil 64 which is attached to the same fin structure 41 as the coil 19 so that air passing from the intake duct 40 by the fins 41 will be cooled by the coil 64 when the compressor 60 is operating. The freon from coil 64 is then returned to compressor 60 by a return pipe. Additional components such as expansion valves and freon filter-driers may also be incorporated in the system in accordance with well-known practice.

By using the same set of fins 41 for both the heating coil 19 and the cooling coil 64, the resistance to air flow and hence the blower power required by the motor 47 driving the blower 42 is minimized since essentially the same fin area is required whether the air is being cooled or heated. If desired, of course, separate heat exchanger units with separate fins may be used in place of the coils 64 and 19 with the common fins 41. In addition, if desired, one of the coils such as, for example, the heating coil 19 may be placed in the upper compartment after the air has been blown up by the blower 42.

The condenser coil 62 has air blown over it from inside the unit 10 by means of a fan 65 driven by a motor 66. As illustrated herein, the fan 65 is mounted in a surrounding shroud 67 to improve fan efficiency.

Vents 68 on the sides of the package 10 in the region occupied by the heater 11 and the compressor 60 provide an air intake for burner blower 17 and/or air for fan 65 which also maintains compressor 60 in a condition where operation will not overheat it.

Referring now to FIG. 5, there is shown a typical installation of a package unit 10 in a home having a gabled roof. The package 10 mounted on the side thereof facing the back of the house and the ducts 40 and 46 are connected through the roof of the house into the attic. As illustrated herein, the duct 46 supplies air to the various rooms of the house through a distribution duct work system blowing the air which has been heated or cooled through the ceiling at the center of each room. The return air is collected by a central duct feeding the duct 40. Gas for the heater 11 may come from a utility supply or from a storage tank at the back of the house from which a pipe is fed to the system 10 on the roof. The package unit 10 may alternatively be connected through the wall at the back of the house, may be set in a recess in the wall, may be placed in the basement or in a pit or on a slab at the side or back of the house. In the case of commercial installations or on other structures having flat roofs, the unit 10 may be placed on the roof.

Referring now to FIG. 6, there is shown a control circuit for the package unit 10. Power is supplied to lines 80 and 81 from a power supply system. As illustrated herein, the voltage on lines 80 and 81 may be, for example, a conventional 240 volt 60 cycle AC supply which in the case of conventional home power systems will have a voltage at 120 volts with respect to ground applied to each of the wires 80 and 81. A crankcase heater for compressor 60 is connected directly across lines 80 and 81 so that whenever power is available to the package unit, sufficient heat is supplied to the compressor crankcase to maintain the oil in the crankcase substantially free of condensed refrigerant. By this means, the compressor will be maintained in a lubricated condition during operation whereas if refrigerant had been allowed to dissolve in the oil, upon starting of the compressor, the oil would foam thereby decreasing its lubricating ability.

The temperature in the area being heated or cooled is controlled by means of a thermostat 83 positioned in an area such as a room of the home. Thermostat 83 comprises two temperature control switches which, in accordance with well-known practice, are adjustable to various temperatures dependent on the mechanical setting of a bellows or bimetallic strip linkage. As illustrated herein, the thermostat switch 88 controls the cooling system and the thermostat switch 89 controls the heating system. The thermostat 83 is in a low voltage circuit supplied from lines 80 and 81 by means of a transformer 86 whose primary winding 87 is connected across lines 80 and 81 and whose secondary winding 85 supplies a lower voltage of, for example, 24 volts to the thermostat control circuit. More specifically one end of winding 85 is connected through a fuse 84 to a common terminal of thermostat switches 88 and 89. The other end of winding 85 is connected through a thermostatically controlled limit switch 98 to a burner control unit 99 and to one end of a heater control relay coil 93. The other terminal of switch 89 is connected to a terminal 91 of a manually operated heat-cool selection switch 90 which when set in the "heat" position connects terminal 91 to terminal 92 which in turn is connected to the other end of the relay coil 93. Terminal 92 also feeds the other power input of the burner control unit 99.

Thermostat switch 89 is operated by a mechanical temperature sensing device of any desired type such as a bimetallic strip or as illustrated herein by a bellows and is designed to open when the temperature reaches the desired level in the room to be heated. When the temperature drops below the desired level switch 89 closes energizing relay control winding 93 which closes relay contacts 93a thereby connecting a pump motor 28 which drives pump 27 across the lines 80 and 81. Blower motor 47 driving blower 42 is also energized by contacts 93a which connect high speed winding 94 of motor 47 and its starting winding 95 fed by a condenser 96 across lines 80 and 81.

Contacts 93a are in parallel with a water temperature control switch 97 which is placed on the line 18 to sense the temperature of the water as it comes out of the heater 11. The temperature at which switch 97 closes is made, for example, 100° F. so that when the thermostat switch 89 has energized the system to produce heat from the heater 11 and the water, which is circulating since contacts 93a are closed, has risen above 100° F. switch 97 will close and therafter when the burner for the heater 11 shuts down, the pump motor 28 and blower motor 47 will continue to run until the temperature of the water emerging from the heater falls below 100° F. Thus all of the heat above 100° F. which has been stored in the heater 11 due to the metal heat sink effect is transferred to the air being circulated through the ducts 40 and 46. In addition, since some portions thereof are substantially hotter than the liquid, the heat in the heater 11 must be removed or it will vaporize some of the liquid in the tubes 13 thereby driving portions of the fluid out the vent 25 and in addition opening limit switch 98 in the heater 11 which is set at a temperature of, for example, 200° F. Limit switch 98 would not reclose until the heat in the heater 11 had been dissipated by radiation, thereby increasing the recycle time of the heater.

The burner control module 99 may be any desired conventional type and as illustrated herein comprises an ignition transformer 100 feeding an igniter spark plug 101 in heater 11. The solenoid of gas valve 16 is also fed by a control circuit of the burner control system 99 such that when thermostat switch 89 closes, gas valve 16 opens supplying gas to the regulator 15. When blower 17 starts it draws a relatively small flow of gas through the regulator 15 and as it comes up to speed and blows the full amount of air called for by the burner more gas passes through the regulator 15 and mixes with the air being blown into the burner by the blower 17. Thus the gas-air mixture remains relatively constant independent of the speed of the blower, the burner does not start with an overrich supply of air-fuel mixture so that there is substantially no carbonization of the heater matrix 12 and no smoke appears at the output vent 32.

Since the opening of limit switch 98 shuts down both the control module 99 and the relay 93 controlling the blower motor 28, there is a double or redundant fail-safe action. If, for example, the gas valve 16 were to remain open when the control system 99 de-energized the solenoid of the valve 16, for example, due to sticking of the valve, the burner blower motor 28 would be also de-energized by opening relay contacts 93b and therefore no gas would flow into the heater. Thus, there is both an electrical and a mechanical fail-safe system associated with the burner system.

When it is desired to operate the package unit as a cooling system, the manually operated selector switch 90 is placed in the cool position and under these conditions a contact 110 which is connected to the other terminal of cooling thermostat switch 88 from that connected to fuse 84 is connected to a contact 111 of switch 90 which is connected through a compressor control relay coil 112 to the junction between limit switch 98 and transformer secondary winding 85. This energizes relay coil 112 which closes contacts 112a and 112b and energizes compressor motor 120 from buses 80 and 81. As illustrated herein, the compressor motor is a conventional capacitor start and run single phase motor having a conventional overload switch associated therewith. Connected in parallel with compressor motor 120 is motor 66 which drives fan 65 to blow air over the condenser coil 62 so that whenever the compressor 60 is running the fan 65 is drawing air over the compressor 60 to ensure that it does not overheat and blowing the air over the condenser coil 62 to cool the compressed refrigerant being pumped thereto.

Terminal 111 of switch 90 is also connected via a terminal 113 to a manually operated automatic-manual switch 114 for controlling the blower 42. In the automatic position, a relay coil 116 is energized via switch 114 by connecting terminal 113 of switch 114 to terminal 115 of switch 114 thereby closing relay contacts 116a to energize a low speed winding 94a of motor 47. Thus when the thermostat switch 88 closes when the temperature in the room rises above a pre-selected value the compressor will start and the fan and the blower 42 will run at a reduced speed to circulate cooled air through the ducts 40 and 46. The blower 42 is run at a reduced speed during cooling since the amount of heat being transferred during cooling is usually less than that required for peak heating loads. For example, the unit illustrated herein transfers 30 to 40,000 BTU's per hour during cooling and 100,000 BTU's per hour or more during heating.

For continuous operation of the blower 42 without thermostatic control, switch 114 is switched to the manual position so that relay coil 116 is energized by connection of contact 115 of switch 114 to terminal 117 of swtich 114 which is connected directly to fuse 84 thereby bypassing the thermostat switch 88. In this mode of operation the air will continuously circulate through the area being heated or cooled even when no heating or cooling is being supplied to the heat exchanger coils 19 or 64.

This concludes the description of the preferred embodiment of the invention illustrated herein, however, many modifications thereof will be apparent to persons skilled in the art without departing from the spirit and scope of this invention. For example, a compact unit as illustrated herein can use a compact heater circulating fluid to a heat exchanger positioned adjacent the unit which heats hot air for supply to a building to be heated without the installation of a condensing unit for cooling. In addition, heating fluid other than a liquid may be used such as steam or vapor of other fluids than water. Other means of supplying a cooling system could be used such as an adsorption heat pump system which could use the heat from the heater 11. Also, systems may be used in which the circulating pump for the liquid is eliminated and the system can be designed to operate at any desired pressure by selection of the fluid to be circulated through the heater. Furthermore, many modifications of the control circuitry may be made to achieve the control functions set forth in this invention. Accordingly, it is intended that this invention not be limited to the particular details disclosed herein except as defined by the appended claims.

What is claimed is:

1. A package heat exchange system control comprising:
    a first heat exchanger;
    means for supplying heat from the products of combustion to said first heat exchanger for supplying heat to a first fluid comprising a liquid;
    conduit means connected between said first heat exchanger and a second heat exchanger for directing said fluid through said second heat exchanger;
    blower means for directing air through said second heat exchanger;
    blower control means responsive to the temperature of said first fluid; and
    means for preventing boiling of said liquid comprising means, responsive to the temperature of said first fluid emerging from said first heat exchanger, for controlling the circulation of said first fluid through said first and second heat exchangers and for maintaining said circulation after the supply of heat to said first heat exchanger has terminated and until said temperature is reduced to a predetermined value below the boiling point of said liquid in said system.

2. The heat exchange system in accordance with claim 1 wherein said first heat exchanger has a surface area in heat exchange relationship with said products of combustion which is substantially greater than the area of said first heat exchanger in heat exchange contact with said first fluid.

3. The heat exchange system in accordance with claim 1 wherein said means for supplying the products of combustion to said first heat exchanger is controlled by means responsive to the temperature of a region supplied by said air directed through said second heat exchanger.

4. The heat exchange system in accordance with claim 3 wherein said means for supplying said products of combustion to said first heat exchanger comprises a burner positioned within a plenum surrounded by said first heat exchanger.

5. The heat exchange system in accordance with claim 4 wherein said burner is supplied with a gaseous fuel-air mixture from a blower.

6. The heat exchange system in accordance with claim 5 wherein said means for supplying said products of combustion comprises a gaseous fuel pressure regulator having an output pressure below atmospheric pressure and feeding to the input of said blower.

7. The method of controlling the supplying of heat from the products of combustion to a load in a package heat exchange system comprising the steps of:
    producing said products of combustion and directing said products of combustion through a first heat exchanger for supplying thermal energy from said products of combustion to a first fluid comprising a liquid through solid surfaces of said first heat exchanger;
    circulating said first fluid through said first heat exchanger and a second heat exchanger for transferring thermal energy from said first fluid through solid surface of said second heat exchanger to air;
    directing said air through said second heat exchanger to absorb said thermal energy by means comprising a blower;
    controlling both the operation of said blower and the circulation of said first fluid in response to the temperature of said first fluid emerging from said first heat exchanger; and
    preventing boiling of said liquid after cessation of the production of said products of combustion by continuing said circulation until the temperature of said fluid emerging from said first heat exchanger is reduced to a predetermined value below the boiling point of said liquid in said system.

8. The method in accordance with claims 7 wherein: said step of supplying thermal energy from said products of combustion to said first fluid comprises contacting a surface area of said first heat exchanger with said products of combustion which is substantially larger than the surface area of said heat exchanger contacted by said first fluid.

9. The method in accordance with claim 7 wherein: said step of circulating said first fluid through said first and second heat exchangers comprises pumping said fluid by a pump; and
said step of controlling said circulation of said fluid comprises controlling said pump in response to the temperature of said fluid.

10. The method in accordance with claim 8 wherein: said step of controlling the pumping of said fluid comprises continuing the pumping said fluid, following the termination of the supplying of thermal energy from said products of combustion to said first heat exchanger, for a time whose duration is a function of the temperature of said first fluid.

* * * * *